US009426420B2

(12) United States Patent
Cicic et al.

(10) Patent No.: US 9,426,420 B2
(45) Date of Patent: Aug. 23, 2016

(54) DATA DISTRIBUTION SYSTEM

(71) Applicant: Media Network Services AS, Oslo (NO)

(72) Inventors: Tarik Cicic, Oslo (NO); Jan Marius Evang, Oslo (NO); Haakon Bryhni, Oslo (NO); Richard Aas, Oslo (NO)

(73) Assignee: MEDIA NETWORKS SERVICES AS, Oslo (NO)

( * ) Notice: Subject to any disclaimer, the term of this patent is extended or adjusted under 35 U.S.C. 154(b) by 0 days.

(21) Appl. No.: 14/386,260

(22) PCT Filed: Mar. 18, 2013

(86) PCT No.: PCT/GB2013/050678
§ 371 (c)(1),
(2) Date: Sep. 18, 2014

(87) PCT Pub. No.: WO2013/140141
PCT Pub. Date: Sep. 26, 2013

(65) Prior Publication Data
US 2015/0312519 A1 Oct. 29, 2015

(30) Foreign Application Priority Data
Mar. 20, 2012 (GB) .................................. 1204825.2

(51) Int. Cl.
*H04N 7/15* (2006.01)
*H04L 12/18* (2006.01)
*H04L 12/24* (2006.01)

(52) U.S. Cl.
CPC .............. *H04N 7/15* (2013.01); *H04L 12/1822* (2013.01); *H04L 41/0893* (2013.01)

(58) Field of Classification Search
CPC ........... H04N 7/15; H04N 7/152; H04N 7/14; H04N 7/142; H04L 12/18
USPC ........................................... 348/14.01–14.16
See application file for complete search history.

(56) References Cited

U.S. PATENT DOCUMENTS 5,680,392 A  10/1997 Semaan
5,732,078 A   3/1998 Arango
(Continued)

FOREIGN PATENT DOCUMENTS

EP    0969687 A1    1/2000
EP    1959637 A1    8/2008
(Continued)

OTHER PUBLICATIONS

Cicic, Tarik et al., "Unicast Extensions to IP Multicast," Department of Informatics, University of Oslo, heim.ifi.uio.no/~meccano/doc/uni_ext.pdf, 2000, 10 pages.
(Continued)

*Primary Examiner* — Melur Ramakrishnaiah
(74) *Attorney, Agent, or Firm* — Withrow & Terranova, P.L.L.C.; Vincent K. Gustafson

(57) ABSTRACT

A data distribution system comprises a plurality of processing devices (8) connected by a packet-based transport network (2), and a session manager (12). The session manager (12) is configured to manage a distribution session by (i) associating two or more of the processing devices (8) with a multicast group on the transport network, (ii) storing and/or accessing a mapping between a session identifier for the distribution session and the multicast group address, and (iii) configuring the transport network (2) and/or the processing devices (8) so that data output to the multicast group by any one of the processing devices in the group is received by all the other processing devices in the group. Each of the processing devices (8) can receive data from a respective node (16) located on an external network, and send the received data, or data derived therefrom, over the transport network (2) to a multicast group. Each processing device can also receive further data over the transport network destined for the respective node (16), and send these further data, or data derived therefrom, to the respective node (16).

27 Claims, 2 Drawing Sheets

(56) References Cited

U.S. PATENT DOCUMENTS

Figure 1:
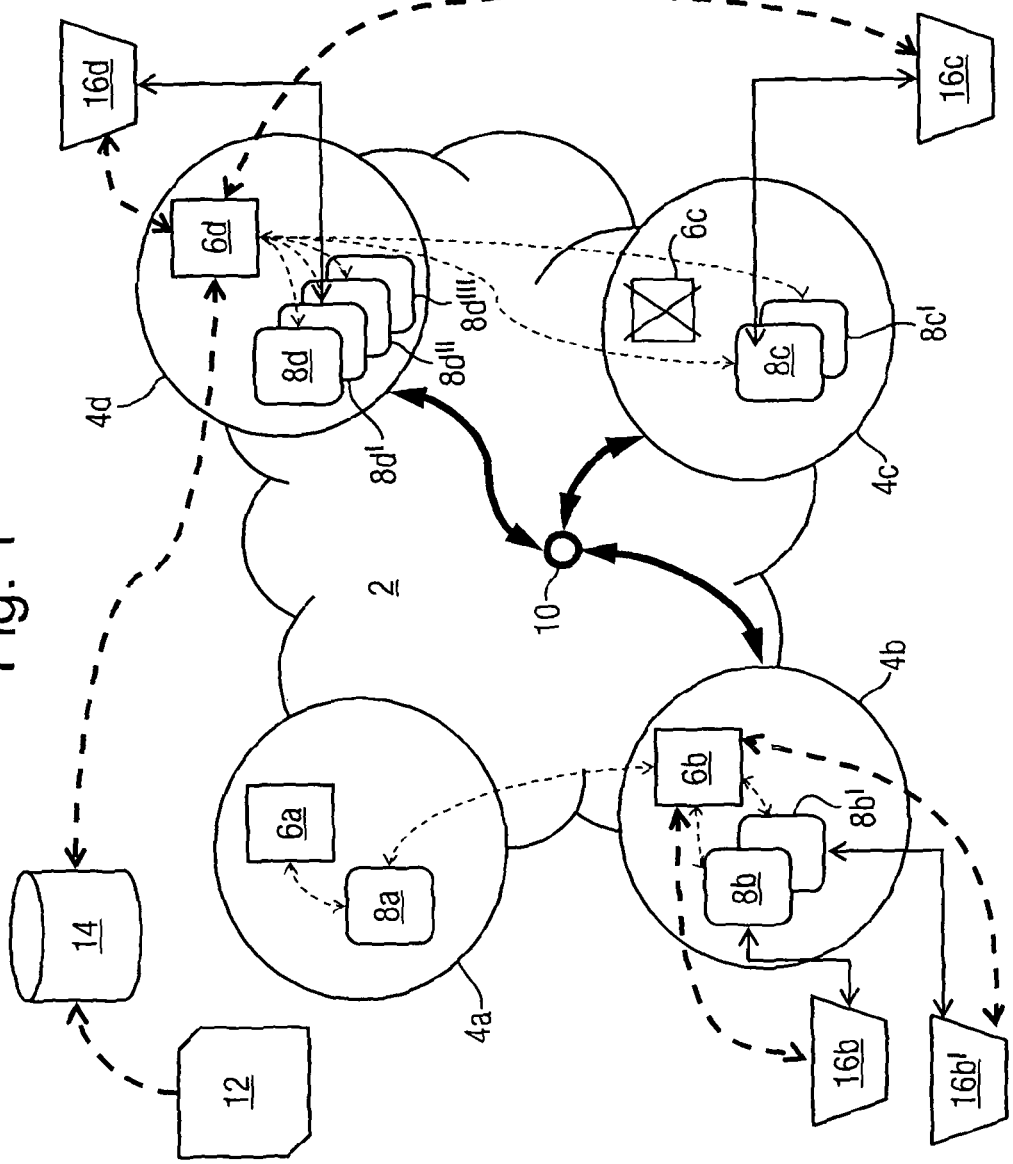

| | | | |
|---|---|---|---|
| 6,138,144 A | 10/2000 | DeSimone et al. | |
| 6,240,462 B1 | 5/2001 | Agraharam et al. | |
| 6,526,445 B1* | 2/2003 | Kumar | H04N 7/152 348/E7.084 |
| 6,687,234 B1 | 2/2004 | Shaffer et al. | |
| 7,103,651 B2 | 9/2006 | Bohannon et al. | |
| 7,213,050 B1 | 5/2007 | Shaffer et al. | |
| 7,512,702 B1 | 3/2009 | Srivastava et al. | |
| 7,720,997 B1 | 5/2010 | Gourlay et al. | |
| 8,725,895 B2 | 5/2014 | Chaturvedi et al. | |
| 2002/0112036 A1 | 8/2002 | Bohannon et al. | |
| 2002/0119821 A1 | 8/2002 | Sen et al. | |
| 2002/0165963 A1 | 11/2002 | Baxley et al. | |
| 2003/0117954 A1 | 6/2003 | De Neve et al. | |
| 2004/0208122 A1 | 10/2004 | McDysan | |
| 2004/0223464 A1 | 11/2004 | Dye et al. | |
| 2004/0258066 A1 | 12/2004 | Chen et al. | |
| 2005/0007446 A1 | 1/2005 | Schrader et al. | |
| 2005/0108328 A1 | 5/2005 | Berkeland et al. | |
| 2005/0114478 A1 | 5/2005 | Popescu et al. | |
| 2006/0109795 A1 | 5/2006 | Kamata et al. | |
| 2006/0112170 A1 | 5/2006 | Sirkin | |
| 2006/0168145 A1 | 7/2006 | Pitts | |
| 2006/0200558 A1 | 9/2006 | Sherer et al. | |
| 2007/0091827 A1 | 4/2007 | Boers et al. | |
| 2007/0106727 A1 | 5/2007 | Mainard | |
| 2008/0186968 A1 | 8/2008 | Farinacci et al. | |
| 2008/0189365 A1 | 8/2008 | Narayanaswami et al. | |
| 2008/0205376 A1 | 8/2008 | Patmon et al. | |
| 2008/0276002 A1 | 11/2008 | Jiang et al. | |
| 2009/0094684 A1 | 4/2009 | Chinnusamy et al. | |
| 2009/0316708 A1 | 12/2009 | Yahyaoui et al. | |
| 2010/0046514 A1 | 2/2010 | Naito et al. | |
| 2010/0131659 A1 | 5/2010 | Narayana et al. | |
| 2010/0157870 A1 | 6/2010 | Song et al. | |
| 2010/0268832 A1 | 10/2010 | Lucas et al. | |
| 2010/0325309 A1 | 12/2010 | Cicic et al. | |
| 2011/0279634 A1 | 11/2011 | Periyannan et al. | |
| 2011/0279636 A1* | 11/2011 | Periyannan | H04N 7/141 348/14.09 |
| 2012/0127263 A1 | 5/2012 | Ogle et al. | |
| 2013/0070767 A1 | 3/2013 | Chen et al. | |
| 2013/0246654 A1 | 9/2013 | Cicic et al. | |

FOREIGN PATENT DOCUMENTS

| | | |
|---|---|---|
| EP | 2202946 A2 | 6/2010 |
| EP | 2387177 A1 | 11/2011 |
| GB | 2431818 A | 5/2007 |
| JP | 2009246845 A | 10/2009 |
| WO | 2009084967 A1 | 7/2009 |
| WO | 2009084968 A1 | 7/2009 |
| WO | 2011143438 A1 | 11/2011 |
| WO | 2012059749 A1 | 5/2012 |

OTHER PUBLICATIONS

Kawahsima, Masahisa et al., "Design and Implementation of Distributed Multimedia Session Manager for Efficient Multi-point Applications," Telecommunications Information Networking Architecture Conference Proceedings, Apr. 12-15, 1999, IEEE, pp. 107-119.

International Search Report and Written Opinion for International Patent Application No. PCT/GB2013/050678, mailed Jun. 28, 2013, 12 pages.

Takabatake, Toshinori, "A Scheme of Relay Server Selection Methods for NAT Traversal through Home Gateways," Australasian Telecommunication Networks and Applications Conference (ATNAC), Dec. 7-10, 2008, Adelaide, SA, IEEE, pp. 116-121.

Reynders, Deon, "Practical TCP/IP and Ethernet Networking for Industry," Oct. 14, 2003, Newnes, pp. 104 and 106.

* cited by examiner

DATA DISTRIBUTION SYSTEM

This application is a national phase under 35 U.S.C. §371 of International Patent Application No. PCT/GB2013/050678 filed on Mar. 18, 2013, and further claims priority to United Kingdom Patent Application No. 1204825.2 filed on Mar. 20, 2012. The disclosures of the foregoing applications are hereby incorporated by reference herein in their respective entireties.

This invention relates to data distribution systems and methods, especially, although not exclusively, for audio-visual data streaming.

Internet videoconferencing is popular with residential and commercial users. While many videoconferencing calls involve just two parties, it is often desirable for three or more parties to confer simultaneously. However, this is not technologically straightforward.

A peer-to-peer approach can be used, in which each videoconferencing terminal (or end-point) sends video data directly to all the others terminals, but this places high demands on the terminals in terms of network-traffic and processing load, particularly as the number of parties grows. Moreover, many existing terminals cannot support this mode of operating.

Instead, multipoint control units (MCU) are often used. An MCU is a server which bridges a call between multiple parties. Each terminal communicates directly with the MCU, which can then process the incoming data streams (e.g. changing video resolutions, translating between different protocols, etc.) as needed, and send appropriate videoconferencing data to each terminal.

A problem with this approach is that the MCU is often physically remote from at least some of the terminals (e.g. located in a different country or even on a different continent), which can lead to poor call quality due to packet loses and delays.

U.S. Pat. No. 6,687,234 and US 2005/0007446 describe using multiple MCUs to form a call in order to minimize long distance network-usage costs. However, such approaches can still suffer from poor call quality.

The present invention seeks to provide a better approach to data distribution.

From a first aspect, the invention provides a data distribution system comprising:
 a plurality of processing devices connected by a packet-based transport network; and
 a session manager,
wherein:
 the session manager is configured to manage a distribution session by (i) associating two or more of the processing devices with a multicast group on the transport network, (ii) storing and/or accessing a mapping between a session identifier for the distribution session and the multicast group address, and (iii) configuring the transport network and/or the processing devices so that data output to the multicast group by any one of the processing devices in the group is received by all the other processing devices in the group; and
 each of the processing devices comprises means for receiving data from a respective node located on an external network and sending the received data, or data derived therefrom, over the transport network to a multicast group, and further comprises means for receiving further data over the transport network destined for the respective node and sending this further data, or data derived therefrom, to the respective node.

From another aspect, the invention provides a method of distributing data between nodes, the method comprising:
 associating two or more of a plurality of processing devices, connected by a packet-based transport network, with a multicast group on the transport network;
 storing and/or accessing a mapping between a session identifier for a distribution session and the multicast group address;
 configuring the transport network and/or the processing devices so that data output to the multicast group by any one of the processing devices in the group is received by all the other processing devices in the group;
 receiving first data, from a first node located on an external network, at a first one of the processing devices;
 the first processing device sending the first data, or data derived therefrom, over the transport network to the multicast group;
 each other processing device in the group receiving the first data from the first processing device and sending the data, or data derived therefrom, to a respective node located on an external network;
 receiving second data at a second one of the processing devices in the group from its external node;
 the second processing device sending the second data, or data derived therefrom, over the transport network to the multicast group; and
 the first processing device receiving the second data from the second processing device and sending the data, or data derived therefrom, to the first node.

From a further aspect, the invention provides a session manager for a data distribution system, wherein the data distribution system comprises a plurality of processing devices connected by a packet-based transport network, and wherein the session manager is configured to manage a distribution session by (i) associating two or more of the processing devices with a multicast group on the transport network, (ii) storing and/or accessing a mapping between a session identifier for the distribution session and the multicast group address, and (iii) configuring the transport network and/or the processing devices so that data output to the multicast group by one of the processing devices in the group is received by all the other processing devices in the group.

In preferred embodiments, the data may comprise audio data or video data, and are preferably streamed data (e.g. using Real-time Transport Protocol (RTP)). Preferred embodiments are configured to transport videoconferencing data. Each of one or more of the external nodes preferably is, or comprises, a videoconferencing terminal.

Thus it will be seen by those skilled in the art that, in accordance with the invention, intelligent network routing can be used to distribute data packets bi-directionally between multiple processing devices over the transport network. By associating a plurality of processing devices with a particular multicast group for a given data distribution session, the distribution system can easily be configured to handle a large number of simultaneous distribution sessions (e.g. different multi-party videoconference calls), each involving multiple recipients, without generating excessive traffic within the transport network, and without placing an undue processing load on each of the processing devices. This is because each processing device need only output data for each session to a single respective multicast group, regardless of how many recipients there are in the session; the session manager can harness an underlying network routing protocol to ensure that the output data efficiently reach the correct processing devices.

The mapping between a session identifier and a multicast group address enables a node to connect to a particular distribution session simply by referencing the appropriate identifier. The nodes need not be aware of the multicast group address, or even that multicast is being used. At least in some embodiments, the plurality of processing devices may act as a single processing device, as far as each node is concerned.

The feature of storing and/or accessing a mapping is not essential, however, and from a further aspect, the invention therefore provides a data distribution system comprising:

a plurality of processing devices connected by a packet-based transport network; and
a session manager, wherein:

the session manager is configured to manage a distribution session by (i) associating two or more of the processing devices with a multicast group on the transport network, and (ii) configuring the transport network and/or the processing devices so that data output to the multicast group by any one of the processing devices in the group is received by all the other processing devices in the group; and each of the processing devices comprises means for receiving data from a respective node located on an external network and sending the received data, or data derived therefrom, over the transport network to a multicast group, and further comprises means for receiving further data over the transport network destined for the respective node and sending this further data, or data derived therefrom, to the respective node.

From another aspect, the invention provides a method of distributing data between nodes, the method comprising:

receiving first data, from a first node located on an external network, at a first one of a plurality of processing devices connected by a packet-based transport network, wherein the first processing device and at least one other of the processing devices are associated with a multicast group on the transport network;

the first processing device sending the first data, or data derived therefrom, over the transport network to the multicast group;

each other processing device in the group receiving the first data from the first processing device and sending the data, or data derived therefrom, to a respective node located on an external network;

receiving second data at a second one of the processing devices in the group from its external node;

the second processing device sending the second data, or data derived therefrom, over the transport network to the multicast group; and the first processing device receiving the second data from the second processing device and sending the data, or data derived therefrom, to the first node.

From a further aspect, the invention provides a session manager for a data distribution system, wherein the data distribution system comprises a plurality of processing devices connected by a packet-based transport network, and wherein the session manager is configured to manage a distribution session by (i) associating two or more of the processing devices with a multicast group on the transport network, and (ii) configuring the transport network and/or the processing devices so that data output to the multicast group by one of the processing devices in the group is received by all the other processing devices in the group.

Features of any aspect or embodiment described herein may be applied to any other aspect or embodiment, wherever appropriate.

In preferred embodiments of any of the foregoing aspects, the multicast group is associated with a multicast Internet Protocol (IP) address, and preferably also with a port number.

In some embodiments, multicast can be implemented as an overlay network service, but in preferred embodiments of the invention it is run as an IP service. Videoconferencing typically involves bi-directional data flows. Therefore, all the processing devices preferably comprise inputs for receiving data from respective nodes (e.g. videoconferencing terminals) located on one or more external networks, and outputs for sending data over the transport network. Each processing device preferably also comprises an input for receiving data over the transport network and an output for sending data to a node (e.g. a videoconferencing terminal) located on an external network. The processing devices may, in some embodiments, all be substantially identical to each other. They may, for example, all have the same hardware and software, (although certain data stored in a memory of a processing device, such as a product identifier or routing tables, may of course differ from one device to another).

Each processing device preferably comprises communication means and processing means. A processing device may forward a data packet received from a node, or received over the transport network, substantially unaltered, but the processing devices may comprise means for processing received data to derive modified output data from the received data. The processing devices may, for example, comprise means for resizing and or recoding received video data.

When used for videoconferencing, the skilled person will appreciate that processing devices connected by the transport network can effectively act as a single, "distributed" multi-point control unit (MCU), efficiently relaying videoconferencing call data between multiple parties, and being capable of flexibly handling many simultaneous calls, with each call involving different (potentially overlapping) groups of processing devices.

The transport network preferably comprises one or more links that support a guaranteed quality of service (QoS); for example, that offer a guaranteed maximum latency, minimum bandwidth for traffic, maximum jitter, or maximum packet loss. The transport network as whole can preferably provide a quality of service (QoS) guarantee for traffic on the network. In this way, packet latency and loss can be reduced or avoided for data travelling between the processing devices, compared with typical connections on the public Internet. In this way, end-to-end transit quality between nodes can be dramatically improved using embodiments of the present invention, e.g. compared with using one or more traditional MCUs located on the public Internet, because traffic can be distributed extremely rapidly and efficiently within the transport network.

The plurality of processing devices are preferably geographically dispersed, meaning that the physical or network distance between a node (e.g. a videoconferencing terminal) and its nearest processing device will typically be less than when using a traditional single-location MCU, thereby minimising the distance over which data must travel on a network (e.g. the Internet) which will not typically provide any quality of service (QoS) guarantee.

Preferably at least some of the processing devices are located at different sites, collocation centres or Internet exchange points from each other; or in different countries; or on different continents. They may be separated by tens, hundreds or thousands of kilometers. In some preferred embodiments, at least two of the processing devices are separated by at least a thousand kilometers. By having such geographically dispersed processing devices, a videoconference caller in Paris, France can, for example, enjoy high-quality conferencing (high resolution, low latency, etc.) simultaneously with users in Tokyo, Japan and in California, USA, since the videoconferencing data (e.g. audio and sound data packets) travel between the users over a bandwidth-guaranteed transport network for a large proportion of their journey.

The processing devices may have inputs from different respective external networks, or one or more of them may have inputs from the same external network as another. The external network, or each external network, may relay data packets using the Internet Protocol (IP). It may be a public network; i.e. one that can be used by multiple entities, or which does not enforce access control. It is preferably distinct from the transport network.

Preferably the external network or networks form part of the Internet. For example, each external network may be a different autonomous systems (AS) on the Internet.

Two or more of the processing devices may be connected to different respective IP networks. These different networks may, for example, be different Internet Service Provider networks (ISPs). Two or more of the processing devices may have connections to distinct physical networks which are in turn connected to a public network, such as the Internet, through respective gateways or routers. They may, for example, be connected to different respective Ethernet networks or Ethernet network segments, or to different respective broadcast domains. However, more generally, these different external IP networks could be determined by logical subdivisions of an addressing space; for example, with all nodes in one of the external networks sharing the same value for a predetermined number (e.g. 18 or 24) of the most-significant bits of their respective network addresses.

The processing devices are preferably located at respective points of presence (PoPs) between the transport network and the one or more external networks. A PoP may be peered with an Internet Service Provider (ISP) serving a node (e.g. a videoconferencing terminal) with which a processing device at the PoP is communicating, but this is not essential; the PoP may instead be peered with another ISP or an Internet backbone provider that is relatively close, but not directly connected, to the node.

The transport network is, in some embodiments of the invention, the same as, or similar to, a dedicated transport network as described in WO 2009/084967 and WO 2009/084968, by the present Applicant, the contents of which are hereby incorporated by reference. Such a dedicated transport network connects retransmission devices (routers or transport relays) located at multiple points of presence (PoPs) using guaranteed bandwidth channels. It is connected to multiple Internet Service Providers (ISPs) so that time-sensitive traffic can be routed from one ISP to another via the guaranteed channels, reducing or dispensing with the need for it to travel over less reliable public Internet links.

The transport network may be a private network, i.e. whose nodes are not all visible or accessible to the public. It is preferably an autonomous system (AS); i.e. a network having a registered autonomous system number (ASN). It may implement access control; for example, requiring a password, key or the like before allow a node to send data over the transport network; or it could comprise identity authentication, e.g. by means of an IP address or the like.

The processing devices may be connected by any number of intermediate nodes within the transport network; in some embodiments, the shortest path between a pair of the processing devices may comprise at least two or more intermediate nodes (e.g. routers) within the transport network.

The session manager may be a single or distributed server; it may be located on an external network but is preferably located on the transport network (albeit preferably publicly accessible from the Internet). It is preferably configured to instruct one or more processing devices to forward received data for a particular session (e.g. videoconference call) to a specific multicast group. The session manager may be configured to instruct one or more processing devices to join a particular multicast group. Communication between the session manager and a processing device may be direct, or may happen via the agency of a separate control device, as described below.

The session manager may instruct a processing device to listen to all multicast traffic addressed to a particular multicast group and sent by others of the processing devices (i.e. those processing devices which are in communication with nodes participating in the same distribution session).

The transport network preferably comprises one or more Internet Protocol (IP) multicast routers. Such routers can implement the efficient distribution of data packets amongst the processing devices in a session group. Alternatively or additionally, the transport network may comprise other multicast-capable devices or applications. The system may be configured so that a processing device joins a multicast group by using the Internet Group Management Protocol (IGMP).

The session manager may be configured to provide an interface (e.g. an HTTP interface accessible over the Internet) by which a human user or administrator can create, manage and/or close a data distribution session (e.g. a multi-party videoconferencing call). The interface may be secured, e.g. password protected.

The session manager may associate a uniform resource identifier (URI) with a session; e.g. crypticstring@domain.com or sip:crypticstring@domain.com:5060. In addition to a domain name or identifier ("domain.com"), the URI may contain a session string ("crypticstring") which is preferably cryptic or difficult to guess (e.g. a randomly generated string of characters).

In a preferred set of embodiments, the session manager is configured to transmit a URI to an administrator or to users of videoconference terminals when establishing a new session. The URI may be the same for all the participating terminals or may be specific to each participating terminal (e.g. with a different session string for each). Typically, the administrator will disseminate the URI or URIs directly to the intended session participants, e.g. by email. The URI can be entered into a conventional videoconferencing terminal, which can use a standard control protocol, e.g. SIP or H.323, to call in to the session. This ability to make efficient use of a transport network as described for multi-party conference calls without having to reconfigure or replace existing (legacy) videoconferencing terminals is a particular advantage of at least some embodiments of the invention.

Each distribution session (e.g. videoconferencing call) is preferably associated with an identifier, which may be a number or a string, for example. The session manager is preferably configured to store and/or access a mapping between a session identifier (ID) and a multicast group address. In some embodiments, the session ID may be the same as a session string described above, or there may be a mapping between a session ID and a session string (e.g. accessible to the session manager).

These session ID mappings may also map a media type (e.g. audio, video, secondary video, text messaging, whiteboard sharing, etc.) to a multicast group address. They may also map a session identifier to a port number. Thus, in one set of embodiments, a session ID and media type pair can be mapped to a multicast group address and port number pair.

The mappings may be stored in a database, accessible to the session manager. They may be stored in any suitable format, in volatile or non-volatile memory. The database is preferably distributed (i.e. being stored across multiple memory devices attached to different processor), for increased robustness. A session identifier may be specific to a session or to a particular participant (e.g. node or user) in a session. In the latter case, a single session may thus be associated with a plurality of session identifiers, one for each participant.

The distribution system may also comprise one or more control devices, which may be used when initiating a session. These may be located in some, or preferably all, of the same points of presence or sites as the processing devices, although this is not essential. They may share at least some physical hardware (e.g. memory, processing means, network components, etc.) with the processing devices, but are preferably separate. (The use of control devices is not essential, however, and in some embodiments, the processing devices themselves may provide some or all of the features or functionality described herein as being provided by the control devices.)

Each control device is preferably contactable by a node (e.g. a videoconferencing terminal) located on an external network. It may be configured to use a videoconference control protocol, such as SIP or H.323, to establish a call with a terminal.

In a videoconferencing application, the control device may be contacted by a videoconferencing terminal (node), using a URI as explained above (although, in some embodiments, the control device might initiate contact with a terminal instead).

Preferably, the system comprises a plurality of control devices, all advertising a common, anycast network address on the external network or networks (e.g. the Internet). When a URI is issued, as above, the domain name or identifier ("domain.com") preferably resolves to the anycast network address. When a node sends data to this network address, the external network (e.g. Internet) will typically inherently route the data to the control device on the transport network which is nearest to the terminal under network metrics, thereby minimising the distance travelled by the data over an external network (which typically does not provide any QoS guarantee).

This features is inventive in its own right, and thus, from another aspect, the invention provides a data distribution system comprising a first control device, a second control device, and a plurality of processing devices, all mutually connected by a packet-based transport network, wherein both control devices are configured to advertise the same external network address to nodes on one or more external networks, and wherein each control device is configured to receive a session initiation request from a node on an external network and to designate a processing device to receive data from that node during a distribution session.

The external network may be the Internet. The network address may be an Internet Protocol (IP) address.

The transport network preferably has a common routing policy. It is preferably a private network with access control and preferably supports guaranteed quality of service.

Embodiments of this distribution system preferably have some or all of the features described herein with respect to the other aspects of the invention.

In any aspect of the invention, the session manager and control devices are preferably configured to exchange data relating to a session. These data may relate to authentication, session strings or identifiers, media types, multicast group addresses and port numbers, etc. When a node on an external network initiates contact with a control device, the control device preferably receives a session string or identifier from the node and communicates this to the session manager, preferably along with media type information. The control device may be configured to authenticate a node or a user thereof. The session manager is preferably configured to return a network address to the control device (e.g. a multicast group address), preferably along with a port number, assuming any authentication check which may be implemented is approved (for example, the cryptic session string being verified as correct).

Each control device is preferably configured to select one of the processing devices and to transfer the session (e.g. forward the videoconferencing call) to the selected processing device. The control device may do this by sending a network address of the selected processing device to the node, so as to cause the node to communicate directly with the processing device thereafter. Alternatively, the control device may instruct the processing device to initiate direct contact with the node, so as to cause the node to communicate directly with the processing device thereafter. The selected processing device can then receive, process and send subsequent data packets for the session. Preferably the system is configured so that the control device does not receive any audio-visual data packets, but only control data relating to session initiation and management, while the processing device receives all audio-visual data packets sent by the node within a particular session.

Each control device may be associated with one or more processing devices. In a preferred set of embodiments, each control device is associated with at least one processing device located at the same point of presence as the control device (e.g. at the same site, collocation centre or Internet exchange point). In this way, when a node on an external network is located near to the control device (e.g. as a consequence of using the anycast addressing described above), the control device can normally select a processing device which is similarly near to the terminal (unless one is unavailable, or unless another processing device is preferred for some reason). This can minimise the distance travelled by session data packets over network connections external to the transport network (which typically do not provide any QoS guarantee), and maximise the proportion of the end-to-end distance between the nodes on the external networks over which the data travels on the transport network (which preferably provides a minimum QoS), leading to better end-to-end communication quality than if a more-distant processing device were used.

A processing device may, of course, be in direct communication with more than one external node for a particular session (i.e. not via the transport network).

The system may be configured with the capability of establishing a distribution session that only involves one processing device. This may be advantageous where, for example, several nodes are geographically close to each other and are all directed to communicate with a single processing device. In this case, data can pass efficiently between the nodes without having to travel over any links of the transport network. A multicast group need not necessarily be established in such a situation.

Some or all of the control devices may be associated with respective pluralities of processing devices, which may include at least one processing device located at a different PoP from an associated control device. Conversely, some or all of the processing devices may be associated with multiple control devices, which may include at least control device located at a different PoP from an associated processing device. In this way, if a particular control device or processing device fails or otherwise becomes unavailable, a substitute can be used by the system. A control device may select a processing device based on one of more of: its proximity to the control device (e.g. preferring a processing device located at the same PoP as the control device), its proximity to a videoconferencing terminal, its available processing capacity, and current network load within the transport network.

In some embodiments, a control device is advantageously configured to request a transfer of a session (e.g. by sending a SIP session initiation request for a videoconferencing call) to all of its associated processing devices, but then to transfer the session to the one processing device whose response it receives first. This approach provides load-balancing between processing devices and can also provide redundancy in case of the failure or unavailability of a processing device. During normal load levels, the response of a processing device at the same physical location (e.g. PoP) as the control device should be received first, making it likely that the nearest processing device to the external node will handle the subsequent session data.

Each control device is preferably configured to communicate a multicast group identifier (such as an IP address and optionally port number) for a session to the selected processing device. Alternatively, a selected processing device may contact the session manager to obtain this information directly.

This approach to load-balancing is inventive in its own right, and thus, from another aspect, the invention provides a data distribution system for distributing data to or from a node, the system comprising a control device and a plurality of processing devices and being configured to establish a distribution session by:
  the control device sending a session initiation message to each of the processing devices;
  each of the processing devices receiving the session initiation message and sending a response to the control device; and
  the control device designating the processing device whose response the control device receives first to exchange data with the node during the distribution session.

The data is preferably audio-visual data, and the node may be a videoconferencing terminal. Any two or more of the control device, processing devices and node may communicate with each other using the Session Initiation Protocol (SIP) or H.323 standard. The control device(s) and processing devices are preferably connected to each other by a transport network, as described elsewhere. Preferably at least one processing device is located at the same point of presence (e.g. building or physical site) as the control device.

The system may comprise a second control device, connected to this first control device. The second control device may be associated with a second plurality of processing devices. The first control device may be configured to send a session initiation message to each of the second plurality of processing devices as well as to the first plurality of processing devices. Each of the second plurality of processing devices may be configured to receive the session initiation message and to send a response to the control device. The first control device may be configured to designate one of the second plurality of processing devices to process data during the distribution session, if the control device receives a response message from that processing device ahead of any other.

The control device may be configured to designate a processing device by sending an instruction to the processing device instructing the processing device to communicate directly with the node for the distribution session. Alternatively, the control device may be configured to designate a processing device by sending an instruction to the node instructing the node to communicate directly with the processing device for the distribution session.

Embodiments of this distribution system preferably have some or all of the features described herein with respect to other aspects of the invention.

In any aspect of the invention, each processing device can preferably process data from multiple simultaneous sessions.

Each processing device is preferably configured such that, when a session is transferred to it (e.g. when a videoconferencing call is forwarded to it by a control device), the processing device negotiates with the node regarding the type or format of session data to be sent by the node to the processing device. The processing device may request one of a predetermined set of standard video-encoding combinations, for example. If the node (e.g. a videoconferencing terminal) provides data conforming to a requested format, the processing device may forward the data directly over the transport network to the multicast group network address. If, however, the processing device receives data in a non-standard format, it is preferably configured to recode the data into one of a set of predetermined formats, before sending them onto the transport network. This recoding may comprise decoding, resizing and encoding a video stream, for example.

Where a session involves more than two participating nodes, a processing device may receive data streams (e.g. Real-time Transport Protocol (RTP) streams) from two or more other processing devices, addressed to the same multicast group. Each processing device is preferably configured to separate a plurality of received data streams by RTP session ID. It preferably decodes each stream and resizes it if required (e.g. if so instructed by an administrator via the session manager interface). It may, for example, collate several video streams into a pattern such as a regular grid (e.g. 2×2 or 3×3) or with one large rectangle for an active speaker, possibly with smaller rectangles for inactive participants. It may optionally scale the collated stream to suit a recipient node (e.g. a videoconferencing terminal), before sending an output stream over the external network to the node.

Any feature described herein with reference to one embodiment or aspect may, wherever appropriate, also be used in any other of the described embodiments or aspects.

Figure 2:
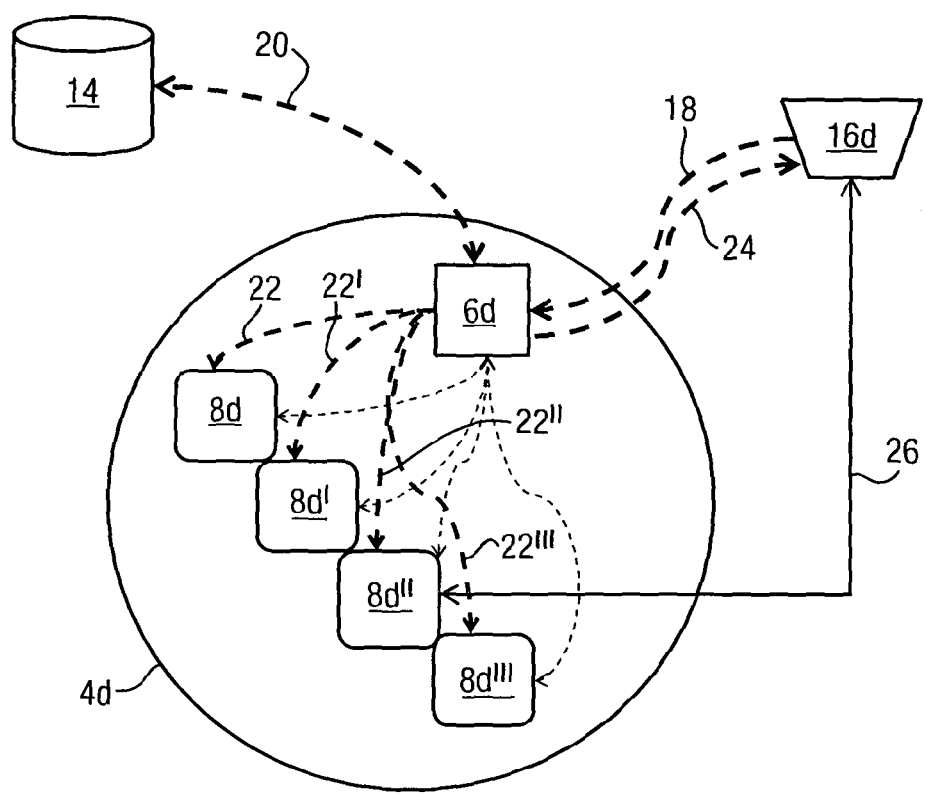

Certain preferred embodiments of the invention will now be described, by way of example only, with reference to the accompanying drawings, in which:

FIG. 1 is a schematic diagram of components and connections in a videoconferencing system embodying the invention; and FIG. 2 is schematic diagram illustrating transactions involved in setting up a videoconferencing call.

FIG. 1 shows a videoconferencing system which utilises a global communication network 2 dedicated to media traffic (i.e. providing strict QoS guarantees). This dedicated network 2 is organized as a single autonomous system (AS). It is reachable in the Internet address space and interfaces with external networks (e.g. other autonomous systems; not shown) at various geographically-dispersed points of presence (PoP) 4a, 4b, 4c, 4d. These may be in collocation centres in different respective countries, for example.

Each of the PoPs 4a, 4b, 4c, 4d contains a respective control device 6a, 6b, 6c, 6d, and at least one processing device 8a, 8b, 8b', 8c, 8c', 8d, 8d', 8d'', 8d''', the operations of which are described below. The control device 6c in the third PoP 4c is struck through to illustrate a fault condition.

The PoPs 4a, 4b, 4c, 4d are mutually connected by the dedicated network 2. The network 2 may have any number of internal connections and routers (not shown) which are of conventional design. At least one of the routers is an IP multicast router 10, which enables the network 2 to support multicast delivery of data packets within the network 2.

The system also uses a management device 12 and a distributed database 14, which need not necessarily be within the dedicated network 2, but are accessible by the control devices 6. The management device 12, on its own or in combination with the distributed database 14, acts as a session manager for the system.

A number of videoconferencing clients (endpoints and videoconference systems) 16b, 16b', 16c, 16d are shown, which are external to the dedicated network 2. These nodes are thus located on one or more external networks. Two of these clients 16b, 16b' are closest to the second PoP 4b. Another client 16c is closest to the third PoP 4c, while the last 16d is closest to the fourth PoP 4d.

When initiating a videoconferencing session, the control devices 6 are the first point of contact for the external clients 16. The control devices 6 and clients 16 communicate using standard protocols such as SIP or H.323 or any other suitable videoconferencing control protocol.

The main role of the control devices 6 is to authenticate clients 16, select a processing device 8 for the client 16, and forward the call to the selected processing device 8.

The processing devices 8 can run a multitude of multi-party videoconferencing sessions. Each session involves one or more clients 16 (an external media source) and a single multicast group per media type (audio, video, and other types).

When a videoconferencing call is underway, the processing devices 8 involved in the call receive unicast data from respective clients 16. They process the data and forward them to the associated multicast group. These multicast data are sent exclusively over the dedicated network 2, and, by virtue of IP multicast, only to the other processing devices 8 which have associated external clients 16 participating the same multiparty session.

Furthermore, each processing device 8 receives multicast data packets from other processing devices 8 that are addressed to multicast groups associated with the active session at that processing device 8. The processing devices 8 process the received data and forward them to the external client or clients 16 connected to the same session.

A management device 12 is used to administer the videoconferencing system. It feeds data about active sessions to a distributed database 14, which stores mappings of the type:

(session ID, media type)=>(multicast group address, port number)

for all active videoconferencing sessions.

Each videoconferencing session can have one or more media types associated, including audio, video, secondary video, text messaging, whiteboard sharing, etc. Thus, each (session ID, media type) pair uniquely identifies a (multicast group address, port number) pair in the dedicated network 2.

To the external clients 16, the system appears like a standard multipoint control unit (MCU). In particular, it has globally uniform appearance, and it is reachable using standard URI-based dialing.

The PoPs 4 are geographically and network-wise distributed across land boundaries and continents. Each PoP 4 has a control device 6 and one or more processing devices 8. Each processing device 8 is registered with one or more control devices 6 (illustrated by fine dashed lines). This registration implies that the control device 6 will count on the processing device's 8 resources for videoconference session processing.

Each processing device 8 is registered to the control device 6 in its own PoP, and to another control device 6 (e.g. in a different PoP) for redundancy. If a control device 6 fails, its function is backed up by a control device 6 in a neighbouring PoP. This is illustrated in FIG. 1, where the control device 6c in the third PoP 4c is shown as having failed. The processing devices 8c, 8c' in the PoP 4c can instead be controlled by the control device 6d in the fourth PoP 4d.

Videoconferencing sessions can be created using an administrative interface provided by the management device 12. This may be a web interface. The administration interface allows for session creation and deletion. It may also support session scheduling (i.e. setting start/finish times in advance), setting media requirements, setting participant number requirements, etc.

Access to the management device 12 is protected and restricted to registered administrators. When an authorised administrator creates a session, a URI is created, formed as crypticstringservingaspassword@domain.com This URI contains a domain ID ("domain.com") and a session ID ("crypticstringservingaspassword"). The session ID is a cryptic string unlikely to be guessed by third party. The session ID may be generated separately for each participant, or shared by the participants. In any case, the administrator has to communicate the URI to each participant using e-mail or other means.

External clients 16 use standard control protocols like SIP to call in to the videoconferencing session. They dial the received URI in their endpoint. The domain ID "domain.com" is resolved to an anycast IP address within the dedicated network 2 address space. DNS or another standard system can be used for this address resolution. The anycast IP addresses are syntactically identical to unicast addresses, and are operated by the dedicated network 2 autonomous system. Any computer system in the Internet can send data to the anycast addresses in this pool, and they will be routed to the dedicated network 2.

The particular IP anycast address is routed to the videoconference system network cloud, and data addressed to it should be processed by the control device 6 at the PoP 4 at the closest point of entry to the dedicated network 2 (i.e. the nearest PoP in terms of network metrics). For example, a client 16b close to the second PoP 4b will reach the control device 6b at that PoP. If the closest control device 6 or PoP 4 has a problem, calls will be routed to another nearby PoP 4 by means of network routing protocol like BGP, OSPF or similar. This is shown for the third PoP 4c, which is the closest PoP to a client 16c; however, because of a fault in the control device 6c at that PoP 4c, traffic from the client 16c relating to call initiation is instead routed to the control device 6d at the fourth PoP 4d.

For clients 16 where dialing the cryptic string URI is impractical (such as those with only infrared remote controls), alternative dialing options are known. For example, the client 16 can dial in to a well-known static URI, and type a short, dynamically generated code using dual-tone multifrequency (DTMF) signalling.

FIG. 2 shows in more detail how an external client 16d connects to a videoconferencing session.

When a control device 6d receives an incoming call 18 from the client 16d, it first authenticates 20 the client 16d by checking the received "cryptic" URI against the session database 14. The control device 6d may access the database 14 directly, or may communicate with the management device 12 which in turn access the database 14.

Once authenticated, the control device 6d forwards SIP session initiation requests 22, 22', 22", 22''' to all the processing devices 8*d*, 8*d'*, 8*d''*, 8*d'''* registered with the control device 6*d* (registration is illustrated by thin dashed lines). These processing devices 8 may all be on the same PoP 4*d* as the control device 6*d*, but some of them may be on one or more other PoPs 4. The processing device 8*d''* that replies fastest will get the call. This will ensure load balancing and redundancy. A highly loaded processing device 8 need not reply to the call. If all the processing device 8 on a PoP 4 are very busy or are unavailable (e.g. due to a system failure), this may result in a processing device 8 on a different PoP 4 getting the call.

When the first processing device's 8*d''* response have been received, the control device 6*d* informs 24 the client 16*d* about the selected processing device 8*d''*. All consequent SIP communication for this session is directly between the client 16*d* and the selected processing device 8*d''*.

The control devices 6 effectively only authenticate the clients 16, and forward their call requests to a processing device 8 to handle the call itself. The processing device 8*d''* will then send and receive audio-visual data streams 26 to and from the client 16*d*.

A processing device 8 will often register to two or three control devices 6, including the local control device 6 at the same PoP 4 and control devices 6 at nearby PoPs 4. This can provide resilience to peaks in traffic. During normal operating conditions, a local processing device 8 will always "win" the race and pick up the call.

Each processing device 8 only subscribes to the sessions (multicast groups) for which it has active clients 16.

Video on the dedicated network 2 should adhere to one of a set of predefined, standard encoding combinations. Each of these combinations defines the encoding standard, resolution etc. A processing device 8 negotiates with the client 16 during the call setup phase, and requests the encoding combination closest to the client's offering.

If the encoding combination is accepted, the selected processing device 8*d''* forwards the stream 26 directly onto the multicast backbone provided by the dedicated network 2. If non-standard video is received, the stream 26 is if necessary decoded, resized and encoded before transmitting onto the multicast backbone.

In addition to forwarding data received from clients 16 onto the dedicated network 2, each processing device 8 also listens to all multicast traffic addressed to those groups for which it has active sessions. Active sessions for a processing device 8 are those for which it has active clients 16

Several processing devices 8 may send video streams to a single multicast address on the dedicated network 2. At the receiving side, these streams are separated by RTP session ID. All incoming video streams are individually decoded and resized. All resized video streams are stitched together to a 2×2 or 3×3 pattern (or other, such as active speaker in large window, which is common on several MCU implementations). Full picture may be resized again to suit the receiving VC requirements.

Each processing device 8 can perform the above operations for each of its videoconferencing clients 16. Each client 16 will typically only be connected to one conference session at a time.

The invention claimed is:

1. A videoconferencing system comprising a first control device, a second control device, and a plurality of processing devices, all mutually connected by a packet-based transport network, wherein:

the first control device and the second control device are configured to advertise a same external network address to videoconferencing terminals on at least one external network;

each of the first control device and the second control device is configured to receive a videoconferencing session initiation request from a respective videoconferencing terminal on the at least one external network and to designate a respective processing device of the plurality of processing devices to receive data from the respective videoconferencing terminal during a respective videoconferencing session;

each processing device of the plurality of processing devices is configured to: receive data packets for a videoconferencing session; process the data packets; and send the processed data packets across the packet-based transport network to other processing devices of the plurality of processing devices participating in the same videoconferencing session; and the videoconferencing system is configured so that the first control device and the second control device do not receive any audio-visual data packets, but receive control data relating to videoconferencing session initiation and management, while a designated processing device of the plurality of processing devices receives all audio-visual data packets sent by a videoconferencing terminal, within a particular videoconferencing session.

2. The videoconferencing system of claim 1, wherein said at least one external network comprises the Internet and wherein the packet-based transport network is a network having a common routing policy.

3. The videoconferencing system of claim 1, wherein each of the first control device and the second control device is configured to use a videoconference control protocol to establish a videoconference call with a videoconferencing terminal.

4. The videoconferencing system of claim 1, wherein the external network address is an Internet Protocol address.

5. The videoconferencing system of claim 1, wherein the packet-based transport network is a network with access control.

6. The videoconferencing system of claim 1, wherein the packet-based transport network comprises one or more links that support a guaranteed quality of service.

7. The videoconferencing system of claim 1, wherein the at least one external network comprises an external network arranged to route data, addressed to said external network address, from a videoconferencing terminal on the external network to a control device that is nearest to the videoconferencing terminal under network metrics.

8. The videoconferencing system of claim 1, wherein each of the first control device and the second control device is associated with at least one processing device of the plurality of processing devices located at a same point of presence as the respective control device.

9. The videoconferencing system of claim 1, wherein each of the first control device and the second control device is configured to select a processing device of the plurality of processing devices to be designated to receive data from a respective videoconferencing terminal during a respective videoconferencing session based on one or more of: proximity of the processing device to the respective control device; proximity of the processing device to the respective videoconferencing terminal; available processing capacity of the processing device; and current network load within the packet-based transport network.

10. The videoconferencing system of claim 1, wherein each of the first control device and the second control device is associated with one or more processing devices of the plurality of processing devices, and is configured to request a transfer of a respective videoconferencing session to the one or more processing devices associated with the respective control device, but then to transfer the respective videoconferencing session to a processing device of the one or more processing devices from which the respective control device first receives a response.

11. The videoconferencing system of claim 1, wherein each processing device is configured such that, when a videoconferencing session involving a videoconferencing terminal on the at least one external network is transferred to the processing device, the processing device negotiates with the videoconferencing terminal regarding a type or format of videoconferencing session data to be sent by the videoconferencing terminal to the processing device.

12. The videoconferencing system of claim 1, wherein at least some processing devices of the plurality of processing devices are located at sites, collocation centers, or Internet exchange points that differ from each other.

13. A videoconferencing system comprising a first control device, a second control device, and a plurality of processing devices, all mutually connected by a packet-based transport network, wherein:
the first control device and the second control device are configured to advertise a same external network address to videoconferencing terminals on at least one external network;
each of the first control device and the second control device is configured to receive a videoconferencing session initiation request from a respective videoconferencing terminal on the at least one external network and to designate a respective processing device of the plurality of processing devices to receive data from the respective videoconferencing terminal during a respective videoconferencing session;
each processing device of the plurality of processing devices is configured to: receive data packets for a videoconferencing session; process the data packets; and send the processed data packets across the packet-based transport network to other processing devices of the plurality of processing devices participating in the same videoconferencing session; and
the videoconferencing system further comprises a session manager configured to manage a videoconferencing session by (i) associating two or more processing devices of the plurality of processing devices with a multicast group on the packet-based transport network, and (ii) configuring the packet-based transport network and/or the two or more processing devices so that data output to the multicast group by any one processing device of the plurality of processing devices in the multicast group is received by all other processing devices in the multicast group, wherein each processing device of the two or more processing devices is arranged to receive data from a respective videoconferencing terminal located on the at least one external network and to send the received data, or data derived therefrom, over the packet-based transport network to the multicast group, and is further arranged to receive further data over the packet-based transport network destined for the respective videoconferencing terminal and to send this further data, or data derived therefrom, to the respective videoconferencing terminal.

14. The videoconferencing system of claim 13, wherein each of the first control device and the second control device is configured to receive a videoconferencing session string or identifier from a respective videoconferencing terminal on the at least one external network and to communicate the videoconferencing session string or identifier to the session manager; and wherein the session manager is configured to return a network address to the respective control device.

15. The videoconferencing system of claim 13, wherein the session manager is configured to transmit a Uniform Resource Identifier to an administrator or to users of videoconferencing terminals, for establishing a new videoconferencing session, wherein the domain identifier of the Uniform Resource Identifier resolves to said external network address.

16. The videoconferencing system of claim 15, comprising a videoconferencing terminal on an external network of the at least one external network, wherein the videoconferencing terminal is configured to have a Uniform Resource Identifier entered into the videoconferencing terminal, and to use the Uniform Resource Identifier to call in to the videoconferencing session.

17. The videoconferencing system of claim 13, wherein said at least one external network comprises the Internet and wherein the packet-based transport network is a network having a common routing policy.

18. The videoconferencing system of claim 13, wherein each of the first control device and the second control device is configured to use a videoconference control protocol to establish a videoconference call with a videoconferencing terminal.

19. The videoconferencing system of claim 13, wherein the external network address is an Internet Protocol address.

20. The videoconferencing system of claim 13, wherein the packet-based transport network is a network with access control.

21. The videoconferencing system of claim 13, wherein the packet-based transport network comprises one or more links that support a guaranteed quality of service.

22. The videoconferencing system of claim 13, wherein the at least one external network comprises an external network arranged to route data, addressed to said external network address, from a videoconferencing terminal on the external network to a control device that is nearest to the videoconferencing terminal under network metrics.

23. The videoconferencing system of claim 13, wherein each of the first control device and the second control device is associated with at least one processing device of the plurality of processing devices located at a same point of presence as the respective control device.

24. The videoconferencing system of claim 13, wherein each of the first control device and the second control device is configured to select a processing device of the plurality of processing devices to be designated to receive data from a respective videoconferencing terminal during a respective videoconferencing session based on one or more of: proximity of the processing device to the respective control device; proximity of the processing device to the respective videoconferencing terminal; available processing capacity of the processing device; and current network load within the packet-based transport network.

25. The videoconferencing system of claim 13, wherein each of the first control device and the second control device is associated with one or more processing devices of the plurality of processing devices, and is configured to request a transfer of a respective videoconferencing session to the one or more processing devices associated with the respective control device, but then to transfer the respective videoconferencing session to a processing device of the one or more processing devices from which the respective control device first receives a response.

26. The videoconferencing system of claim 13, wherein each processing device is configured such that, when a videoconferencing session involving a videoconferencing terminal on the at least one external network is transferred to the processing device, the processing device negotiates with the videoconferencing terminal regarding a type or format of videoconferencing session data to be sent by the videoconferencing terminal to the processing device.

27. The videoconferencing system of claim 13, wherein at least some processing devices of the plurality of processing devices are located at sites, collocation centers, or Internet exchange points that differ from each other.

* * * * *